United States Patent Office 3,491,056
Patented Jan. 20, 1970

3,491,056
METAL-POLYMER COMPOSITIONS
Frank L. Saunders, James K. Rieke, and James W. Twining, Midland, Mich., assignors to The Dow Chemical Company, Midland, Mich., a corporation of Delaware
No Drawing. Continuation-in-part of application Ser. No. 379,012, June 29, 1964. This application Aug. 18, 1967, Ser. No. 661,507
Int. Cl. C08f 45/04
U.S. Cl. 260—41                                                7 Claims

ABSTRACT OF THE DISCLOSURE

Highly filled moldable plastic-metallic compositions are mixtures comprising (1) copolymers of a major proportion by weight of ethylene and from about 2 to about 25 percent of ethylenically unsaturated carboxylic acid such as acrylic acid, and (2) from about 40 to about 60 percent by volume, based on the total composition, of finely divided solid filler which comprises a major proportion by volume or consists of metallic particles of size from about 5 to about 300 microns. An example is a blend of a high density polyethylene graft copolymer of 8% acrylic acid and aluminum powder.

---

This application is a continuation-in-part of our copending application Ser. No. 379,012 filed June 29, 1964, now abandoned.

This invention relates to metal powder-polymer compositions. More particularly, it relates to polymers of ethylene having interspersed therein fine metallic particles.

It is known in the art to add powdered metal and other inorganic fillers to thermoplastic polymers to improve certain properties of the polymer, particularly the modulus. However, properties such as tensile strength and impact strength are not correspondingly improved. In fact, at higher concentrations of the metal powder, such properties may actually decrease. It would therefore be highly desirable to provide metal powder-polymer compositions that would not only show improved modulus but also greater tensile and impact strength.

It is an object of this invention to provide an olefin polymer composition containing fine metal particles and having improved physical properties. It is another object to provide a moldable olefin polymer composition having metal characteristics such as metallic appearance, machineability and related metal-working properties. A more specific object is to provide a composition containing a polymer of ethylene and a high concentration of fine metal particles. These an dother objects, advantages, features and variations will become apparent from the following description.

In accordance with the present invention, the above and other objects are attained in a composition of a copolymer of ethylene and an ethylenically unsaturated carboxylic acid, wherein said copolymer has interspersed therein finely divided metallic particles.

In one method of making a preferred embodiment of the present invention, up to about 60 volume percent of a fine metal powder such as aluminum is added to a copolymer of ethylene and an ethylenically unsaturated carboxylic acid. The mixture is placed in a conventional blender such as a roll mill, Banbury Mixer or the like to obtain an intimately mixed polymer blend. It is understood that other methods of obtaining suitable metal-polymer blends may also be employed. The composition can be easily cast, extruded, molded or otherwise formed into sheets, tubes or articles having a wide variety of shapes and capable of many different uses and applications, with the metal powder articles being uniformly distributed throughout the resulting article.

The polymer suitable in practicing the present invention comprises a copolymer of a major proportion of ethylene and from about 2 to about 25 percent by weight based on the copolymer of an acidic comonomer selected from $\alpha,\beta$-ethylenically unsaturated mono- and polycarboxylic acids and acid anhydrides having from 3 to 8 carbon atoms per molecule and partial esters of such polycarboxylic acids wherein the acid moiety has at least one carboxyl group and the alcohol moiety has from 1 to 20 carbon atoms. Specific examples of such acidic comonomer are acrylic acid, methacrylic acid, crotonic acid, fumaric acid, maleic acid, itaconic acid, maleic anhydride, monomethyl maleate, monoethyl maleate, monomethyl fumarate, and monoethyl fumarate.

The copolymer preferably employed in this invention is a graft copolymer consisting essentially of high density polyethylene and an unsaturated carboxylic acid. Such copolymers are prepared by known methods such as reacting unsaturated carboxylic acids with a normally solid homopolymer of an olefin such as ethylene at temperatures from about 65° to about 170° C. at atmospheric subatmospheric or superatmospheric pressure.

Random copolymers are also suitable for use in practicing the present invention. Such copolymers may be produced by known methods such as copolymerizing ethylenically unsaturated carboxylic acids with ethylene at elevated temperatures and pressures and in the presence of a suitable catalyst. Where either the random or graft copolymer is employed, it is preferred to have the unsaturated carboxylic acid comonomer present in an amount from about 6 percent to about 12 percent based on the weight of the copolymer.

Metal filler components for the copolymer are any finely divided metal particles, mixtures thereof, metal alloys, or metal oxides. Examples of suitable fillers include aluminum, lead, iron, mixtures of carbon black and metal powders and the like. Various metal particles sizes may be employed to attain certain desired properties. However, favorable particle sizes should be in the range from about 5 microns to about 300 microns and preferably from about 13 microns to about 20 microns. It is understood that blends of metal filler with other suitable fillers such as glass fibers can also be used in practicing this invention.

In the filled copolymer compositions of this invention, the amount of filler or mixture of fillers is from about 40 to about 60, preferably from about 46 to about 55, percent by volume of the total composition. When the filler is a mixture of metal and non-metal components, the specified metal component is a major proportion, i.e. more than half, by volume of the total filler.

The composition of the present invention may be used for making molded cups, magnetic cores for electro-magnets, machine parts, housings, decorative articles, gears, bearings, pulleys and the like.

The following examples are illustrative of the invention but are not intended to limit the scope thereof.

EXAMPLE 1

Seventy-five grams of a high density polyethylene acrylic acid graft copolymer powder containing 8% acrylic acid (325 mesh; melt index, 3.1 by ASTM Test D1238–57T Condition E) prepared by high energy radiation graft polymerization of acrylic acid on high density polyethylene were dry blended with 225 grams of aluminum powder (average particle diameter of 19–20 microns) by rolling in a glass container at room temperature for 24 hours. The intimately mixed powder blend was then fabricated into 6 in. x 6 in. x ⅛ in. sheets by compression molding between heated platens in a Preco hydraulic press using a 8 in. x 8 in. x 1/8 in. plate mold with a 6 in. x 6 in. x 1/8 in. cavity at 200° C. for 5 minutes with 20,000 lbs. platen pressure. After the molded sheet was cooled in the press by circulating water thru the platens, it was removed and cut into 1/2 in. x 6 in. x 1/8 in. strips for physical testing. The physical properties of this material are listed in Table I. Also listed in Table I are the properties of molded sheet similarly prepared from the unfilled polymer.

TABLE I

|  | Filled polymer | Base polymer |
|---|---|---|
| Tensile strength, p.s.i. | 4,243 | 3,405 |
| Tensile modulus, p.s.i.×10$^{-6}$ | 1.08 | 0.16 |
| Flex strength, p.s.i. | 7,708 | 4,453 |
| Flex modulus, p.s.i.×10$^{-6}$ | 0.96 | 0.14 |
| Elongation, percent | 1.9 | 9.0 |
| Notch impact, ft. lbs./in. notch | 1.3 | 0.62 |

EXAMPLE 2

A dry powder blend of the same composition as described in Example 1 was compounded on a heated two roll Thropp mill for 5 minutes at 175° C. The compounded composite was then ground through a Wiley mill, compression molded and tested. The properties of this composite are given in Table II.

TABLE II

|  | Filled polymer | Base polymer |
|---|---|---|
| Tensile strength, p.s.i. | 4,293 | 3,302 |
| Tensile Modulus, p.s.i.×10$^{-6}$ | 1.01 | 0.17 |
| Flex strength, p.s.i. | 7,645 | 4,450 |
| Flex modulus, p.s.i.×10$^{-6}$ | 0.73 | 0.14 |
| Elongation, percent | 1.5 | 7.9 |
| Notched impact, ft. lbs./in. notch | 1.3 | 0.66 |

EXAMPLE 3

In a test not exemplary of the present invention, the procedure described in Example 1 was substantially repeated except a regular high density polyethylene (Melt Index 3) was used in place of the high density polyethylene-acrylic acid graft copolymer. The properties of this composite are given in Table III. Comparing the results shown in Table I with those obtained in Table III shows significant improvements in properties obtained by using the high density polyethylene-acrylic acid graft copolymer in the composite.

TABLE III

|  | Filled polymer | Base polymer |
|---|---|---|
| Tensile strength, p.s.i. | 3,110 | 3,092 |
| Tensile modulus, p.s.i.×10$^{-6}$ | 0.79 | 0.17 |
| Flex strength, p.s.i. | 5,538 | 4,450 |
| Flex modulus, p.s.i.×10$^{-6}$ | 0.81 | 0.14 |
| Elongation, percent | 0.9 | 9.0 |
| Notched impact, ft. lbs./in. notch | 0.43 | 0.76 |

EXAMPLE 4

A series of aluminum powder-high density polyethylene acrylic acid graft copolymer compositions was prepared according to Example 2 with up to 60 percent by volume of aluminum powder. The effect of the aluminum powder content on physical properties of selected samples is shown in Table IV. The data illustrate that desirable improvement in properties is obtained when aluminum powder is present in the mixture in an amount from about 40 percent to about 60 percent by volume. Other tests show that the most desirable properties are obtained when aluminum powder is present in an amount from about 46 to 55 percent by volume.

TABLE IV

|  | Aluminum content, volume percent ||||
|---|---|---|---|---|
|  | 40 | 50 | 55 | 60 |
| Impact strength, ft. lbs./in. notch | 0.66 | 1.2 | 1.24 | 0.8 |
| Tensile strength, p.s.i. | 3,550 | 4,400 | 4,500 | 3,600 |
| Tensile modulus, p.s.i.×10$^{-6}$ | 0.43 | 0.93 | 1.12 | 1.23 |

EXAMPLE 5

The procedure as described in Example 1 was substantially repeated except that 92.1 grams of fine lead powder and 7.9 grams of high density polyethylene-acrylic acid graft copolymer (approximately 50–50 volume percent) were blended to form the composite. The physical properties of this composite are given in Table V.

TABLE V

| Tensile Strength, p.s.i. | 3260 |
|---|---|
| Tensile Modulus, p.s.i. × 10$^{-6}$ | 0.7 |
| Flex strength, p.s.i. | 8340 |
| Elongation, percent | 4.6 |
| Notched impact, ft. lbs./in. notch | 1.1 |

EXAMPLE 6

Example 1 was substantially repeated except that 89.0 grams of fine iron powder and 11.0 grams of high density polyethylene acrylic acid graft copolymer (approximately 50–50 volume percent) were blended to form the composite. The physical properties of this composite are shown in Table VI.

TABLE VI

| Tensile strength, p.s.i. | 5270 |
|---|---|
| Tensile modulus, p.s.i.×10$^{-6}$ | 5.77 |
| Flex strength, p.s.i. | 13,260 |
| Flex modulus, p.s.i.×10$^{-6}$ | 1.5 |
| Elongation, percent | 1.1 |
| Notched impact, ft. lbs./in. notch | 1.13 |

EXAMPLE 7

The procedure of Example 2 was repeated except that 16 percent by volume of the aluminum powder was replaced by carbon black to produce an electrical conducting composite. The total percentage of filler (aluminum and carbon) was 50 per cent by volume. The thin surface layer of polymer was removed by sanding to expose the conducting particles and then successfully nickel-plated by a conventional nickel electro-plating process. ("Chemical Engineer's Handbook" J. N. Perry, Ed., Page 1798, 3rd edition 1950, McGraw Hill.)

EXAMPLE 8

The procedure of Example 2 was followed except that high density polyethylene-acrylic acid graft copolymer was replaced by a random copolymer of ethyelene and acrylic acid containing 10 per cent acrylic acid, and a Melt Index of 5. The properties of this composition are given in Table VII and compared with the unfilled polymer.

TABLE VII

|  | Filled polymer | Base polymer |
|---|---|---|
| Tensile strength, p.s.i. | 2,343 | 853 |
| Tensile modulus, p.s.i. ×10$^{-5}$ | 1.69 | 0.20 |
| Elongation, percent | 1.8 | 23 |
| Notched impact, ft. lbs./in. notch | 1.52 | Too soft |

EXAMPLE 9

The procedure of Example 2 was substantially repeated except that aluminum powder of different average particle size was used. The physical properties of the composites prepared with aluminum of different average particle size are given in Table VIII.

TABLE VIII

| Av. aluminum particle size, microns, dia. | Tensile strength, p.s.i. | Tensile modulus, p.s.i. ×10$^{-5}$ | Elongation, percent | Notched impact, ft. lbs./in. notch |
|---|---|---|---|---|
| 297 | 4,235 | 12.5 | 2.2 | 0.85 |
| 74 | 4,227 | 9.4 | 1.9 | 0.95 |
| 20 | 4,293 | 10.1 | 1.5 | 1.29 |
| 18 | 4,293 | 12.4 | 1.5 | 1.41 |
| 13 | 4,339 | 9.3 | 1.6 | 1.35 |
| 4–6 | 4,203 | 10.9 | 1.5 | 0.63 |

EXAMPLE 10

Table IX shows the improved physical properties of polyethylene-acrylic acid copolymer filled with 50 per cent by volume of aluminum over that of the copolymer without the filler.

TABLE IX

|  | Filled polymer | Base polymer |
|---|---|---|
| Tensile strength, p.s.i.[1] | 4,209 | 3,405 |
| Tensile modulus, p.s.i. $\times 10^{-5}$ | 10.3 | 1.64 |
| Flex strength, p.s.i. | 7,786 | 4,453 |
| Flex modulus, p.s.i. $\times 10^{-5}$ | 8.90 | 1.42 |
| Elongation, percent | 2.0 | 9.0 |
| Notched impact, ft. lbs./in. notch [2] | 1.42 | .62 |
| Abrasion (gms. wt. loss) [3] | 0.0427 | 0.0146 |
| Hardness (Rockwell) [4] | 15/138–153 | 15/88–136 |
| Thermal conductivity (B.t.u./hr./ft.$^2$/° F./ft.) [5] | 5.23 | 1.53 |
| Vicat H.D., ° C.[6] | 139 | 129 |
| Tensile H.D. (66 p.s.i.) [7] | 124 | 118 |
| Creep (1,800 p.s.i.) L/L (100 hrs.) [8] | 0.01 | 0.12 |
| Hrs. to break at 1,800 p.s.i. | 800 | 50 |

[1] ASTM D638–58T.
[2] ASTM D256, 56 Method A.
[3] Taber, wheels CS10F, 2,000 rev.
[4] Rockwell superficial hardness ¼″ ball 15 kg.
[5] Room temp. 6 in. x 6 in. x ⅛ in. sheets: hot 37.9° C., cold 11.0° C.
[6] ASTM D1525–58T.
[7] ASTM D1637–59T.
[8] Compression molded test bars 6 in. x ½ in. x ⅛ in.: L=5 cm., room temp.

EXAMPLE 11

The procedure described in Example 1 was substantially repeated except that 75 gms. of high density polyethylene-acrylic acid graft copolymer, 204 gms. of aluminum powder and 21 gms. of chopped fiberglass strands ¼ in. in length were blended to form the composite. The improved physical properties of this composite over those of the base polymer are shown in Table X.

TABLE X

|  | Filled polymer | Base polymer |
|---|---|---|
| Tensile strength, p.s.i. | 5,810 | 3,405 |
| Tensile modulus, p.s.i. $\times 10^{-6}$ | 1.2 | 0.16 |
| Flex strength, p.s.i. | 12,000 | 4,453 |
| Flex modulus, p.s.i. $\times 10^{-6}$ | 0.93 | 0.14 |
| Elongation, percent | 1.6 | 9.0 |
| Notched impact, ft. lbs./in. notch | 4.8 | 0.62 |

What is claimed is:

1. A composition of matter comprising a copolymer of ethylene and between about 2 and about 25 weight per cent of an ethylenically unsaturated carboxylic acid comonomer having between 3 and 8 carbon atoms per molecule, inclusive, and having interspersed therein between about 40 and about 60 volume per cent, based upon the total volume of said composition, of a finely-divided solid filler comprising more than about 50 volume per cent, based upon the total volume of said filler, of metallic particles of a size within the range of between about 5 and about 300 microns.

2. The composition according to claim 1 wherein the copolymer comprises ethylene and acrylic acid.

3. The composition according to claim 1 wherein the metallic particles are aluminum.

4. The composition according to claim 1 wherein the metallic particles are iron.

5. The composition according to claim 1 wherein the metallic particles are lead.

6. A composition of matter comprising a copolymer of ethylene and from about 2 percent to about 25 percent acrylic acid based on the weight of the copolymer and having interspersed therein from about 46 percent to about 55 percent by volume of finely-divided particles of aluminum, said particles being present in a size from about 13 microns to about 20 microns in diameter.

7. A composition of matter comprising a copolymer of ethylene and from about 2 percent to about 25 percent acrylic acid based on the weight of the copolymer and having interspersed therein from about 46 percent to about 55 percent by volume of a blend of a major proportion of aluminum particles of size from about 13 to about 20 microns and a minor proportion of glass fiber particles, by volume.

References Cited

UNITED STATES PATENTS

| 2,675,363 | 4/1954 | Howard et al. |
| 2,947,646 | 8/1960 | Devaney et al. |
| 3,259,688 | 7/1966 | Towne et al. |
| 3,264,129 | 8/1966 | Rolles et al. _____ 106—290 |
| 3,270,090 | 8/1966 | Nowak _____ 260—878 |
| 3,354,115 | 11/1967 | Brandle et al. |

ALLAN LIEBERMAN, Primary Examiner

J. H. DERRINGTON, Assistant Examiner

U.S. Cl. X.R.

252—511, 512, 513